P. J. POWERS & L. L. GUIBORD.
SANITARY COVER FOR FOOD RECEPTACLES.
APPLICATION FILED JUNE 24, 1910.
1,113,827.
Patented Oct. 13, 1914.
2 SHEETS—SHEET 1.
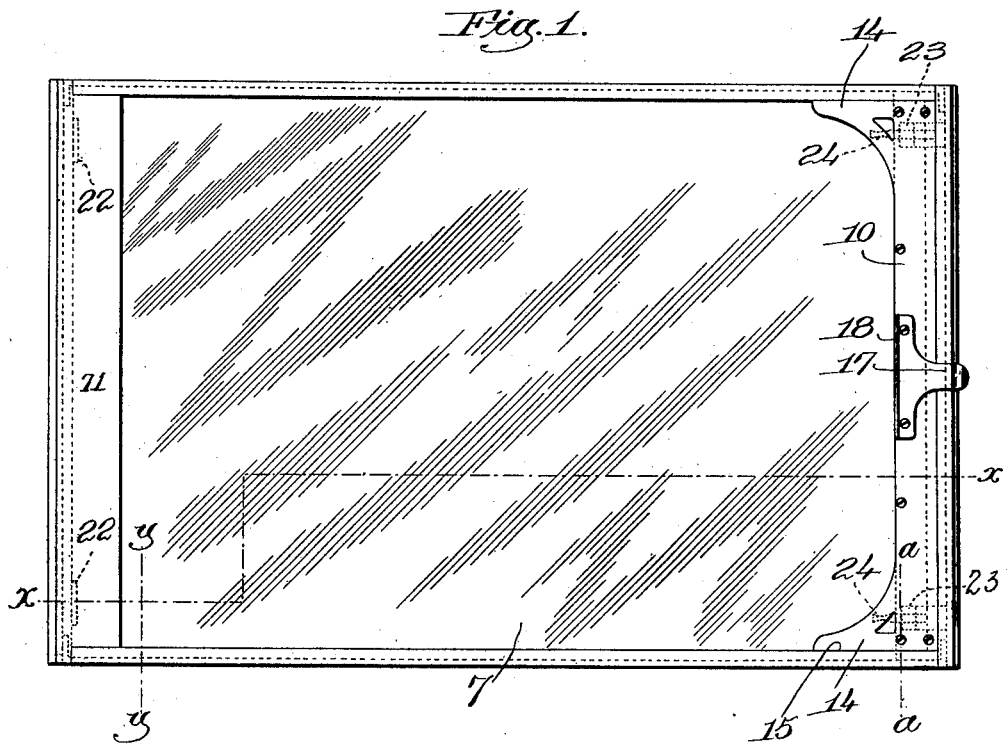
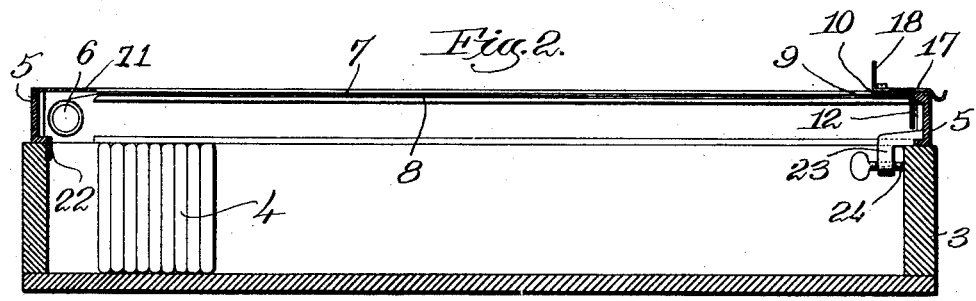
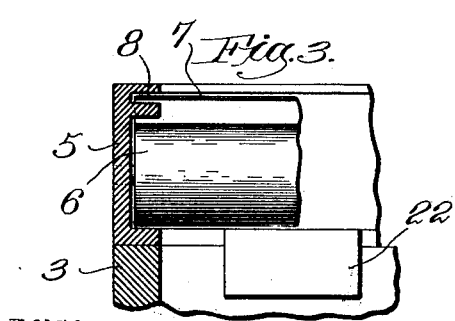
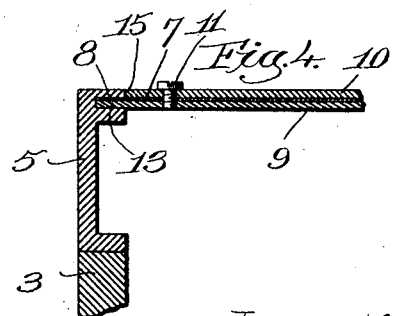
Witnesses.
Thomas J. Drummond.
Joseph M. Ward.
Inventors.
Patrick J. Powers
Leonard L. Guibord
By Crosby & Gregory
attys

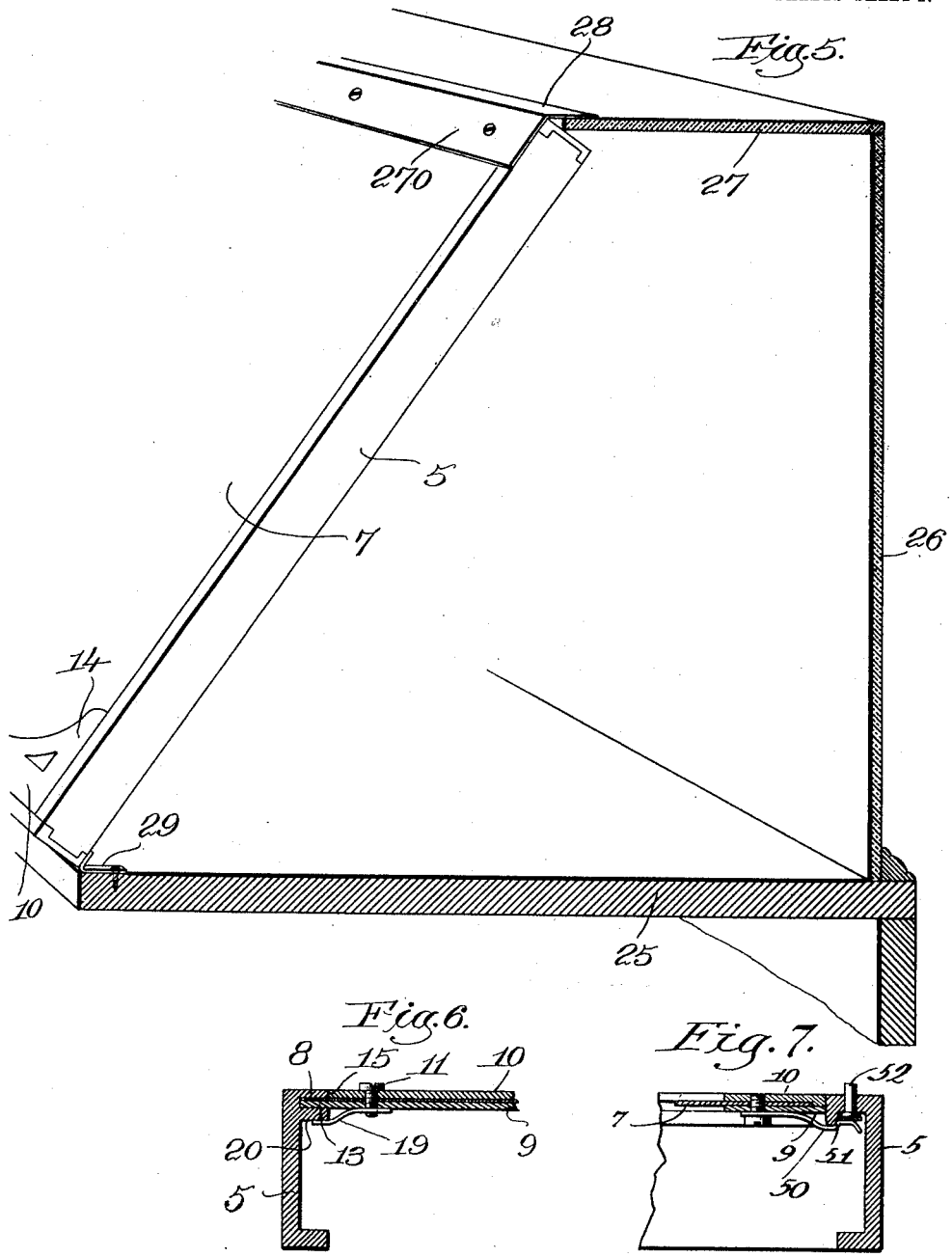

UNITED STATES PATENT OFFICE.

PATRICK J. POWERS, OF WINTHROP, AND LEONARD L. GUIBORD, OF ARLINGTON, MASSACHUSETTS.

SANITARY COVER FOR FOOD-RECEPTACLES.

1,113,827. Specification of Letters Patent. Patented Oct. 13, 1914.

Application filed June 24, 1910. Serial No. 568,675.

*To all whom it may concern:*

Be it known that we, PATRICK J. POWERS, a citizen of the United States, residing at Winthrop, county of Suffolk, State of Massachusetts, and LEONARD L. GUIBORD, a citizen of the United States, residing at Arlington, county of Middlesex, State of Massachusetts, have invented an Improvement in Sanitary Covers for Food-Receptacles, of which the following description, in connection with the accompanying drawing, is a specification, like characters on the drawing representing like parts.

This invention has for its object to provide a novel sanitary cover adapted to close the open tops of food receptacles.

Crackers, biscuits, wafers and other food products are now commonly purchased by the retailer in boxes, barrels, etc., and when the package arrives at the store the top is removed and the contents are sold from the open box or barrel. Frequently no attempt whatever is made to keep the box or barrel covered while the food is exposed for sale and as a result the food which is sold is sometimes in an unsanitary condition.

Our invention aims to provide a novel cover which can be readily applied to a box or other receptacle containing food and which can be readily opened to give access to the box, but by which the box can be kept closed and the contents thereof protected.

The features wherein our invention resides will be more fully hereinafter described and then pointed out in the appended claims.

In the drawings, Figure 1 is a top plan view of a box having our improved cover applied thereto; Fig. 2 is a section on the line $x$—$x$, Fig. 1; Fig. 3 is an enlarged section on the line $y$—$y$, Fig. 1; Fig. 4 is an enlarged section on the line $a$—$a$, Fig. 1; Fig. 5 is a perspective view showing a different manner of using our improved cover;
Fig. 6 is a section through the side of the cover frame showing a friction device which may be employed for holding the cover in different positions; Fig. 7 is a section through one side of the frame of the cover showing a modified construction.

Our invention as herein illustrated comprises a frame having an opening therethrough and adapted to be applied to the open side of the food receptacle, a spring roller supported by the frame, and a flexible cover or closure connected to the spring roller and adapted to be either wound up thereon thereby affording access to the box or to be drawn over the opening in the cover to close the same.

Our improvements can be so constructed as to be used in connection with any food receptacle having an open side or top. In Figs. 1 and 2 we have shown it as it would be used on an ordinary box, such as crackers or wafers are packed in, while in Fig. 5 we have shown it as it would be applied to a counter which is partially closed by glass.

In Figs. 1 and 2, 3 designates an ordinary rectangular box having crackers or wafers 4 therein. The cover which we would use in connection with a box of this type would preferably be rectangular in shape to fit the shape of the box, and in the embodiment illustrated 5 designates the rectangular frame for the cover which is in the form of a rectangular rim adapted to rest on the top of the box 3. The spring roller is shown at 6 and may have any suitable or usual construction and is herein illustrated as journaled in the sides of the frame at one end thereof. The flexible closure is shown at 7 and it is secured at one end to the roller 6 so that it can be wound up thereon in a well-known way. We will preferably make the closure 7 of a flexible transparent material, such, for instance, as celluloid. In order to hold and guide the closure as it is wound on or unwound from the roller 6, we have provided each side of the frame 5 with the guiding groove 8 in which the edge of the closure 7 is received, as clearly seen in Figs. 2, 3 and 4. The free end of the closure 7 is sustained between two clamping members which hold it from curling and which also by their co-action with the frame hold it straight as it is wound on or unwound from the roller. These two clamping plates are shown at 9 and 10, respectively, and the end of the closure 7 is situated between them, and the two plates are clamped together in some suitable way as by means of screws 11. The under clamping plate 9 is preferably provided with a stiffening flange 12 which runs substantially the length thereof and the ends 13 of said plate project into the grooves 8, as clearly seen in Fig. 4. The top clamping plate 10 is provided at each end with the extension 14, the edges 15 of which lie against the inner edges of the sides of the frame 5, as clearly seen in Fig. 4. These edges 15 are of sufficient length so that they hold the clamping plate in its right-line position and prevent it from twisting. The combined action of the guiding edges 15 and the ends 13 of the two plates serves to hold the clamping members always in their proper position and yet permits them to slide freely back and forth in the frame. The upper clamping member has fast thereto a spring catch 17 which is adapted to snap over the end of the frame 5, as seen in Fig. 1, and thus lock the closure in its closed position. Either the spring catch or the upper clamping plate has extending upwardly therefrom a finger piece 18 by which the closure may be opened and shut. If it is desired to provide for holding the closure in any adjusted position, that is, either part way open or entirely open, we may provide the friction fingers 19 which are secured to the under clamping plate 9 and engage the under face 20 of the flange in which the groove 8 is formed, these fingers 19 serving to apply sufficient friction to the flange to hold the closure partially open. The spring roller is situated entirely within the frame and the frame is closed at one end on the top by a plate 71 which covers over the roller and extends to the grooves 8. The closure 7, therefore, at the point where it enters the end of the groove 8 nearest the spring roller is substantially in contact with the edge of the plate 71 and thus a tight joint is produced. This plate 71 serves, therefore, not only to protect and conceal the roller, but also to close any opening which might exist around the roller for the admission of dust or dirt.

The spring of the spring roller need only be strong enough to take up the slack in the flexible closure as the clamping plates are moved to open the cover. With this arrangement the food in the box can be kept clean and free from dust and yet whenever a sale is to be made the closure 8 can be readily slipped open sufficiently to permit the desired quantity to be removed and then can be readily closed again. The frame 5 may be secured to the box in any appropriate way. We have herein shown for this purpose two lips 22 extending downwardly from the inner edge of the frame at one end and adapted to engage the inner side of the box and at the other end of the frame we have shown two brackets 23 each carrying a clamping screw 24 which is adapted to engage the inner side of the box. The clamping screws and the fingers 22 serve to firmly hold the frame in position while permitting of its ready removal from or application to the box.

In Fig. 5 we have shown a construction wherein our improved cover is adapted to close the open side of a show-case which is partially closed by glass. In some stores the crackers and other food products are arranged on a counter 25 and at the front of the counter is placed a glass front 26 from the top of which a glass top 27 extends rearwardly, thus protecting the food products from being handled by the customers who stand in front of the counter. In this construction, however, the back of the counter is always open so that the food products are exposed. Our improved frame can be readily applied to a food receptacle of this construction, and in Fig. 5 we have shown said frame 5 as having secured to the end thereof at which the roller 6 is located a sheet metal holder bent to form the two wings 270, 28, the wing 270 being fastened to the top of the frame and the wing 28 extending at an angle thereto so that it can be made to rest on the edge of the glass 27, as shown in the drawings. The other end of the frame 5 may be secured to the counter in various ways as by means of the clips or brackets 29.

By using other simple attachments a frame embodying our invention can be used for closing the open top or side of any usual food receptacle.

In lieu of the catch 17, as seen in Figs. 1 and 2, we may employ the catch 50 shown in Fig. 7 which is a spring finger secured to the underside of the clamping plate 9 and adapted to engage a shoulder 51 formed on the frame 5. A push pin 52 is shown for releasing the catch from the shoulder.

Various other changes in the constructional details of the device may be made without departing from the invention.

Having fully described our invention, what we claim as new and desire to secure by Letters Patent is:—

1. In a device of the class described, the combination with a frame provided with an opening and also provided with means to detachably secure it to the open side of a box or case, said frame having grooves in its opposite sides, of a spring roller journaled in the frame, a flexible closure secured to the roller and having its edges occupying said grooves, and clamping plates secured to the end of the closure, the ends of one of said plates entering and being guided by the grooves, the other plate having elongated edges which engage the inner face of the frame side and prevent the closure from twisting.

2. In a device of the class described, the combination with a frame provided with an opening and also provided with means to detachably secure it to the open side of a box or case, said frame having grooves in its opposite sides, of a spring roller journaled in the frame, a flexible closure secured to the roller and having its edges occupying said grooves, and clamping plates secured to the end of the closure and extending from one side to the other of the frame, the ends of one of said plates entering and being guided by the grooves and the ends of the other plate engaging the inner part of the frame.

3. In a device of the class described, the combination with a frame having two opposed grooved parallel sides and formed with an opening between said sides, of means to detachably secure said frame to the open side of a box, a spring roll journaled within the frame at one end, a flexible closure secured to the roll and having its edges occupying said grooves, and a plate extending from one side of the frame to the other and covering said roll.

In testimony whereof, we have signed our names to this specification, in presence of two subscribing witnesses.

PATRICK J. POWERS.
LEONARD L. GUIBORD.

Witnesses:
LOUIS C. SMITH,
THOMAS J. DRUMMOND.

Copies of this patent may be obtained for five cents each, by addressing the "Commissioner of Patents, Washington, D. C."